Aug. 3, 1954
W. G. STOLBERG
2,685,299
LUBRICATED VALVE
Filed Nov. 21, 1950
5 Sheets-Sheet 1
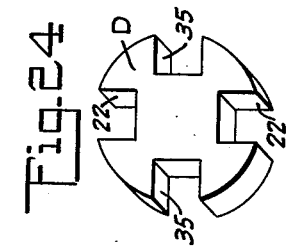
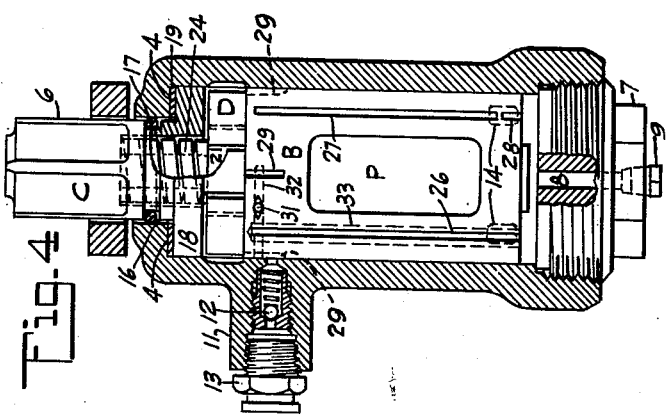
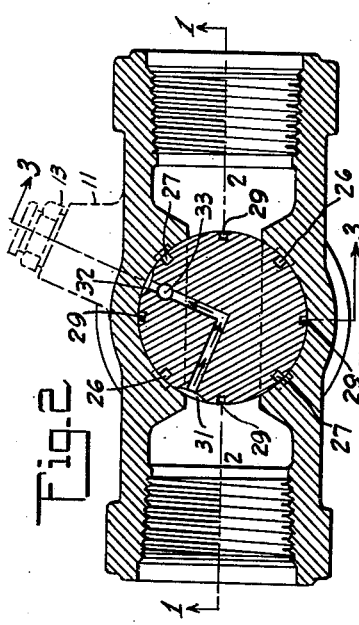
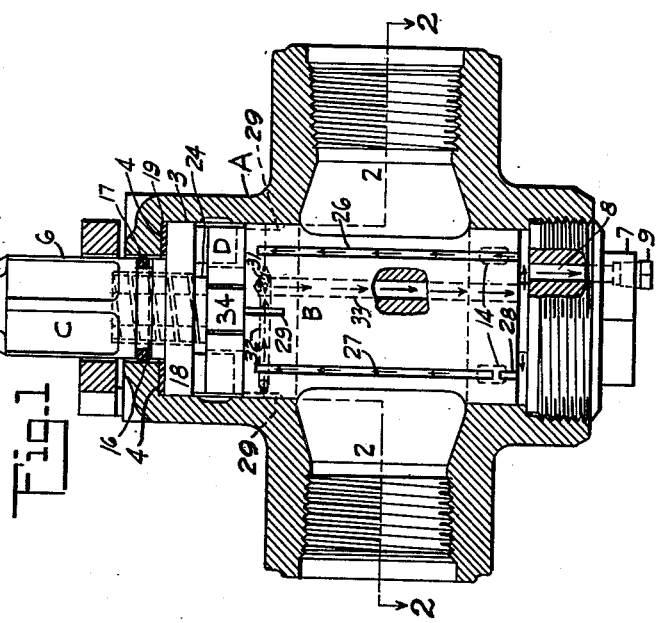
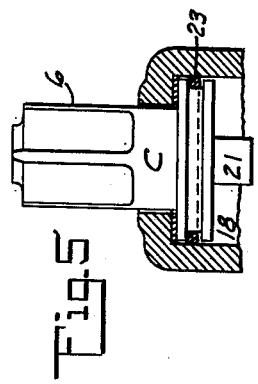
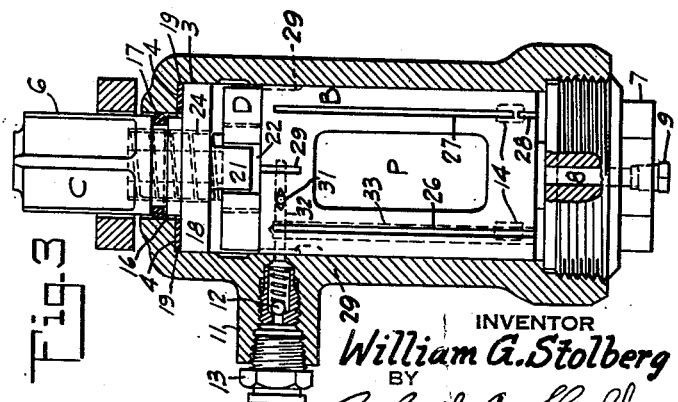
INVENTOR
William G. Stolberg
BY
Robert A. Shields
ATTORNEY Aug. 3, 1954
W. G. STOLBERG
2,685,299
LUBRICATED VALVE
Filed Nov. 21, 1950
5 Sheets-Sheet 2
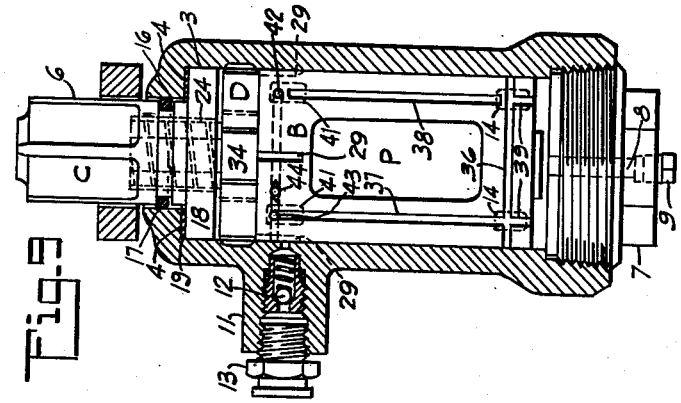
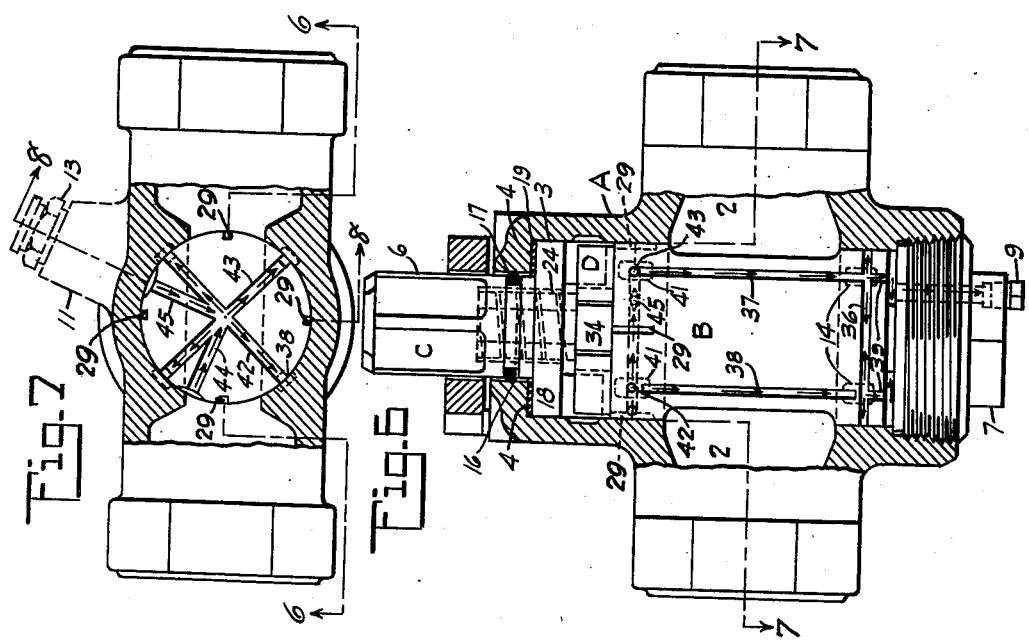
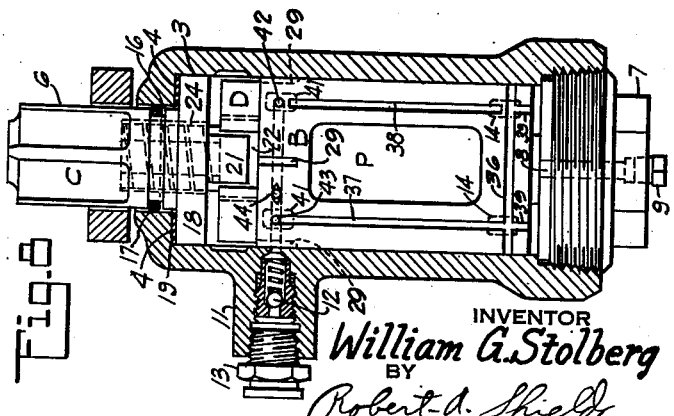
INVENTOR
William G. Stolberg
BY
Robert A. Shield
ATTORNEY Aug. 3, 1954     W. G. STOLBERG     2,685,299
LUBRICATED VALVE
Filed Nov. 21, 1950     5 Sheets-Sheet 3
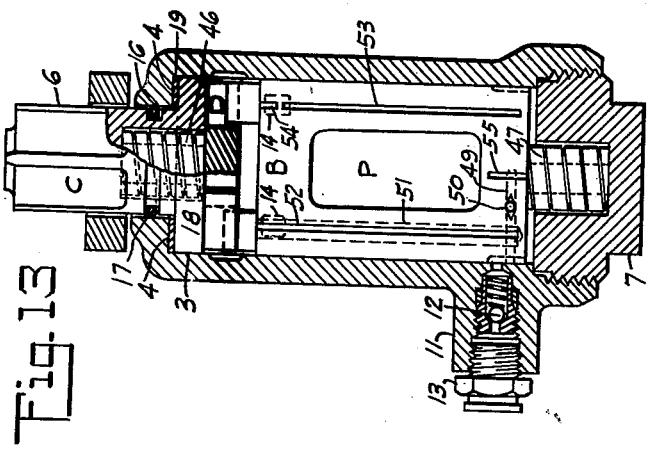
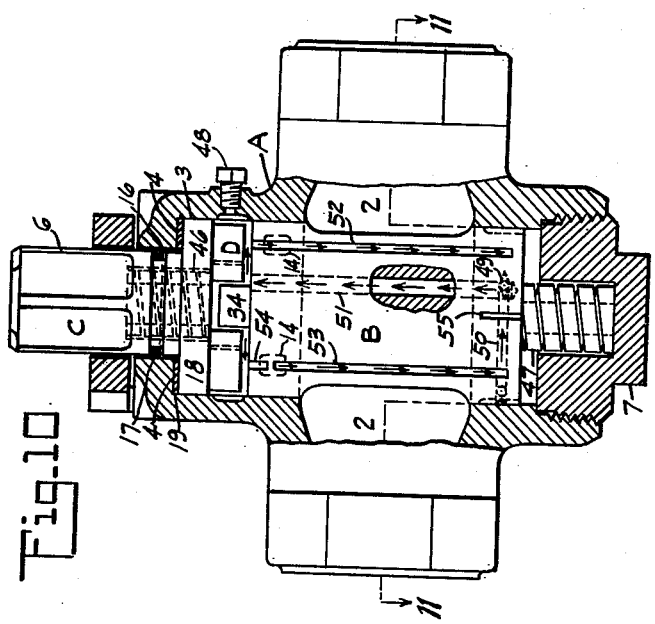
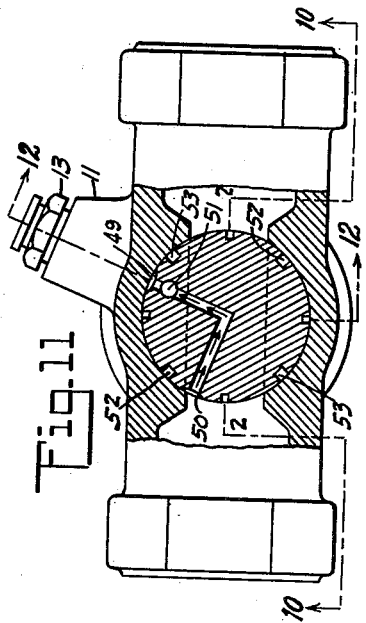
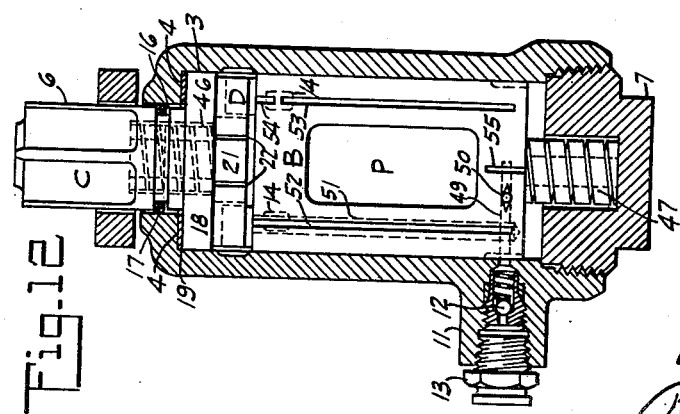
INVENTOR
William G. Stolberg
BY
Robert A. Shield
ATTORNEY Aug. 3, 1954  W. G. STOLBERG  2,685,299
LUBRICATED VALVE
Filed Nov. 21, 1950  5 Sheets-Sheet 4
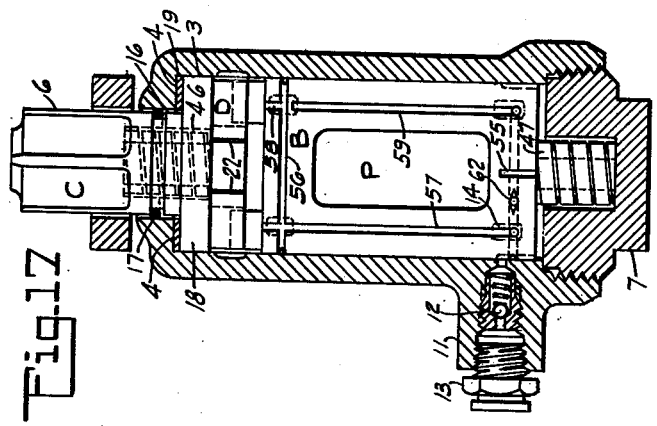
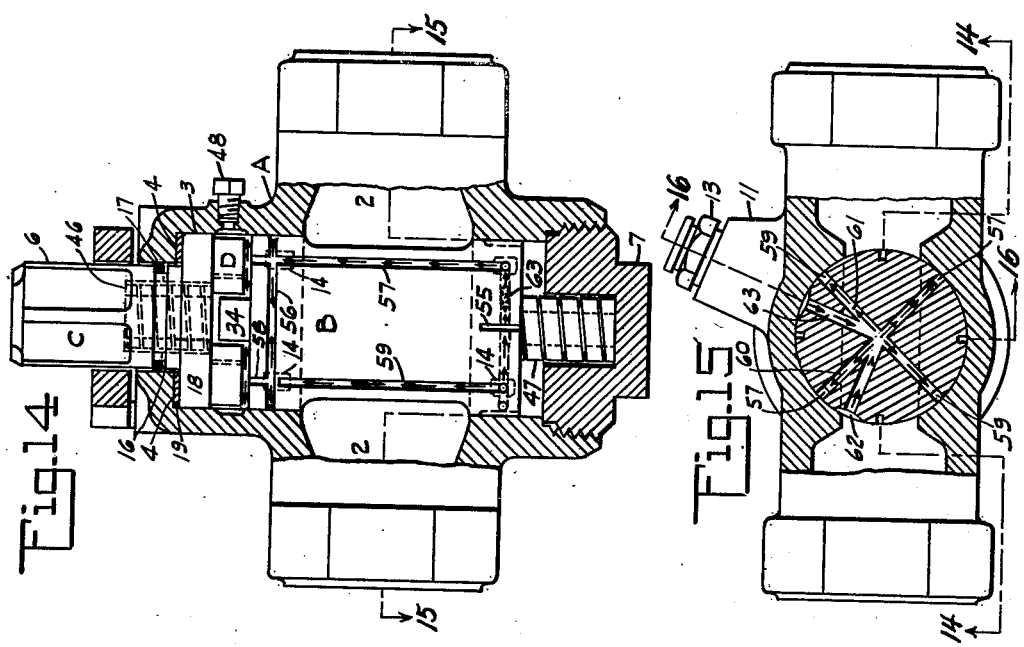
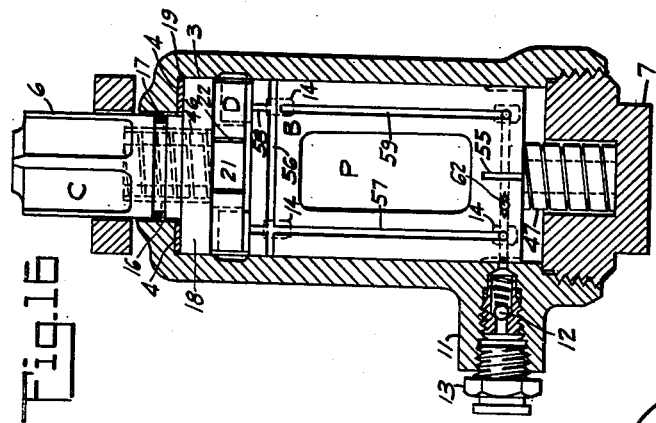
INVENTOR
William G. Stolberg
BY
Robert A. Shields
ATTORNEY Aug. 3, 1954 W. G. STOLBERG 2,685,299
LUBRICATED VALVE
Filed Nov. 21, 1950 5 Sheets-Sheet 5
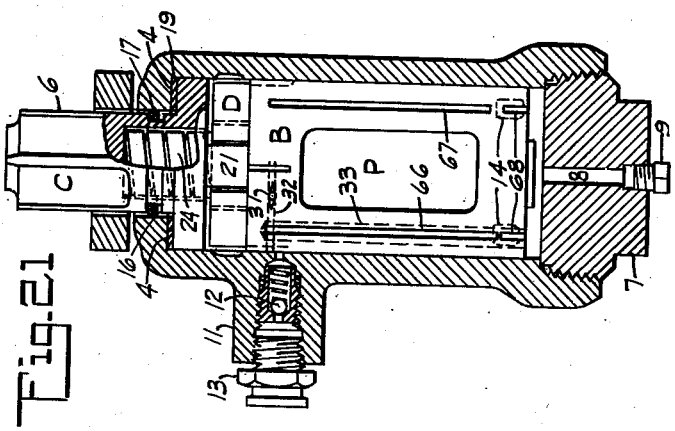
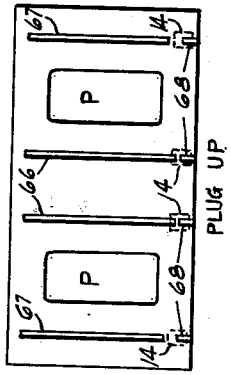
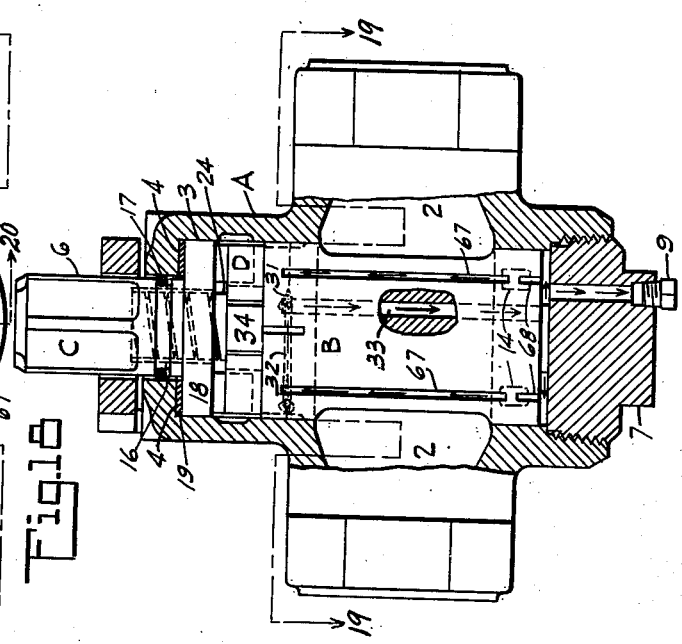
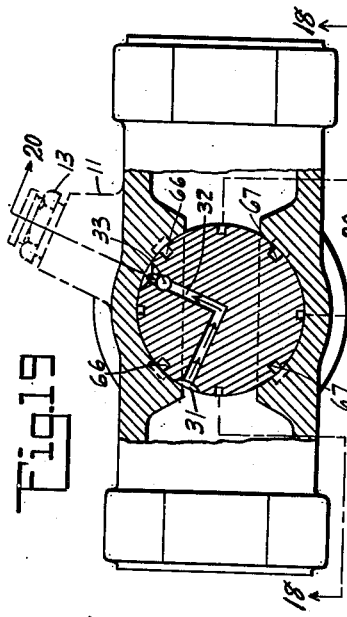
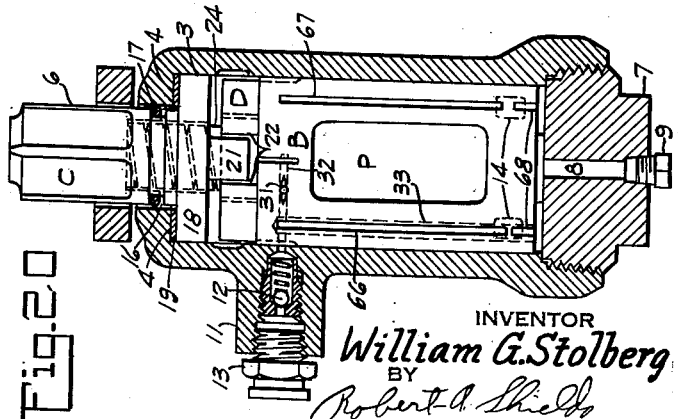
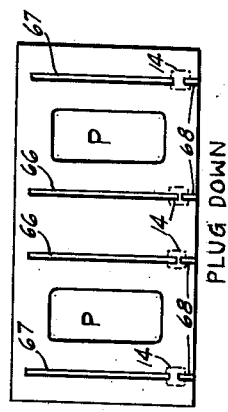
INVENTOR
William G. Stolberg
BY
Robert A. Shields
ATTORNEY Patented Aug. 3, 1954

2,685,299

UNITED STATES PATENT OFFICE 2,685,299

LUBRICATED VALVE

William G. Stolberg, Windsor, Ontario, Canada, assignor to ACF Industries, Incorporated, a corporation of New Jersey Application November 21, 1950, Serial No. 196,731

10 Claims. (Cl. 137—246.22)

This invention relates to valves in general but in particular to lubricated valves having a safety cutoff in the lubricant system.

In lubricated valves it has been found necessary in order to prevent damage to the valve to provide some pressure relief means preventing rupture of the valve body. Various pressure relief means have been provided but they are subject to sticking or to the forcing of foreign material onto seating surfaces with possible damage to the seating surfaces resulting when the valve is turned. It is desirable to not only provide positive means preventing excessive lubricant pressure, but it is also desirable to have a source of extra lubricant to be pressure fed into the grooves thereby extending the period between necessary lubrications. It is an object, therefore, of the present invention to provide a valve having a relatively large lubricant reservoir from which the lubricant may be pressure fed onto the sealing surfaces.

A further object of the invention is the provision of a lubricated valve having a positive cutoff between the valve lubricant system and the source of pressure lubricant to thereby prevent rupture or distortion of the valve.

A still further object of the invention is the provision of a lubricated valve having a floating plug loosely connected to the stem by a floating disc.

A yet further object of the invention is the provision of a lubricated valve having the lubricating system so arranged as to provide selective lubrication insuring lubricant being supplied to the outlet side of the valve plug.

Yet another object of the invention is the provision of a lubricated valve having a floating plug resiliently supported at both ends in the body.

These and other objects of the invention will be apparent to persons skilled in the art from a study of the following description and accompanying drawings, in which Fig. 1 is a sectional view through one form of the improved valve and taken substantially on line 1—1 of Fig. 2;

Fig. 2 is a sectional view taken substantially on line 2—2 of Fig. 1;

Fig. 3 is a sectional view taken substantially on line 3—3 of Fig. 2;

Fig. 4 is a sectional view similar to Fig. 3 but showing the valve in the fully lubricated position;

Fig. 5 is a partial sectional view showing a slight modification of the stem seal;

Fig. 6 is a sectional view taken substantially on line 6—6 of Fig. 7 and disclosing a slightly modified form of valve;

Fig. 7 is a sectional view taken substantially on line 7—7 of Fig. 6;

Fig. 8 is a sectional view taken substantially on line 8—8 of Fig. 7;

Fig. 9 is a sectional view similar to Fig. 8 but showing the parts in fully lubricated position;

Fig. 10 is a sectional view taken substantially on line 10—10 of Fig. 11 and showing a still further modification;

Fig. 11 is a sectional view taken substantially on line 11—11 of Fig. 10;

Fig. 12 is a sectional view taken substantially on line 12—12 of Fig. 11;

Fig. 13 is a sectional view similar to Fig. 12 but showing the valve in fully lubricated position;

Fig. 14 is a sectional view taken substantially on line 14—14 of Fig. 15 and showing a still further modification;

Fig. 15 is a sectional view taken substantially on line 15—15 of Fig. 14;

Fig. 16 is a sectional view taken substantially on line 16—16 of Fig. 15;

Fig. 17 is a sectional view similar to Fig. 16 but showing the valve in fully lubricated position;

Fig. 18 is a sectional view taken substantially on line 18—18 of Fig. 19 and showing a still further modification;

Fig. 19 is a sectional view taken substantially on line 19—19 of Fig. 18;

Fig. 20 is a sectional view taken substantially on line 20—20 of Fig. 19;

Fig. 21 is a sectional view similar to Fig. 20 but showing the valve in fully lubricated position;

Fig. 22 is a development view of the plug surface showing the relation of the parts with the plug in the down position of Fig. 20;

Fig. 23 is a view disclosing a development of the plug surface with the plug in the up position as in Fig. 21, and Fig. 24 is a perspective view of the floating coupling element between the plug and stem.

Referring now to the drawings in detail it will be seen that the valves are constructed with a body portion A, a separate stem portion C and a floating plug portion B slidably received within the body and having driving connection with the stem C through a floating disc D. The body is preferably made of cast material and having passageways 2 formed therein for the flow of matter through the valve body. The passageway is intersected substantially at right angles by a bore 3 which is preferably finished to close tolerances for reception of the plug C which can rotate and slide in the bore. The upper end of the bore is partially closed by overhang shoulders 4, having an opening therethrough to receive the stem 6 projecting outwardly of the valve for reception of a wrench or other operating means. The lower end of the bore is closed by a base plug 7 preferably screwed into the valve body and provided in certain instances with a relief passage 8 closed by a removable plug 9 as shown in Figs. 1, 6 and 18. The body is also formed with a projection 11 adapted to receive therein a check valve assembly 12 and a connection 13 adapted to receive a lubricant gun or other device for introduction of lubricant under high pressure into the valve. In order to prevent S leaks while still permitting full lubrication of the valve, it is necessary that dwarf grooves or spaces 14 be formed in the body and interrupting the bore surface so that the lubricant grooves may be brought into or out of register therewith during turning of the plug.

The stem C is provided beneath the wrench receiving portion 6 with a groove 16 in which is placed an O-ring 17 of resilient material and which will act as a check seal against any possible stem leakage. The inner end of the stem is provided with a circular enlargement 18 having its top surface finished and adapted to bear against a substantially inert washer 19 interposed between the stem enlargement and the shoulder 4 of the body. The lower surface of the enlargement 18 is formed with two projecting lugs 21 adapted to be engaged within notches 22 of the floating disc D. The stem may also be formed as shown in Fig. 5 in which the enlargement 18 has a groove formed therein and the O-ring washer 23 is inserted in this groove instead of in a groove of the smaller portion of the stem. In any case it should be noted that the stem is provided with two members sealing against leakage and is not physically connected to the plug B and is not affected by any axial or radial shifting of the plug due to the use of the floating disc D. The stem C and plug B are urged apart by spring 24 bearing at its upper end in a recess formed in the stem and at its lower end on the top of floating disc D.

Referring specifically to the form shown in Figs. 1 to 4 inclusive, it will be seen that the plug B is of cylindrical shape and has formed therein a passageway P adapted to be aligned with or placed transversely of the passageway 2 of the body. On one side of the passageway P and diametrically opposite each other are formed substantially full length grooves 26, while on the opposite side of the passage and diametrically opposite each other are formed short grooves 27 and 28, which grooves are not connected except at such times as the grooves are in alignment with the dwarf grooves 14 in the body. Short stub grooves 29 interrupt the surface of the plug intermediate the grooves 26 and 27 for the purpose of increasing the sealing and lubrication while at the same time permitting escape of any fluid which might be trapped above the plug B. In order to feed lubricant into the system transverse passages 31 and 32 are located substantially ninety degrees to each other and meet adjacent the axis of the plug. Passage 32 is connected by means of a vertically extending hole 33 with the bottom surface of the plug so that lubricant when fed into either passage 31 or 32 will pass downwardly through 33 to the bottom surface of the plug and thence upwardly in grooves 26, 27 and 28. In order to rotate the plug B lugs 34 are formed on the upper end thereof and adapted to fit into notches 35 of the floating disc D previously referred to.

The operation of this form of valve will be as follows and assuming the parts to be in their non-lubricated position shown in Figs. 1, 2 and 3. Lubricant under high pressure introduced through fitting 13 and check 12 will flow through passage 32 downwardly through hole 33 to the bottom of the plug and thence upwardly in grooves 26 and also 27 and 28 since the latter are connected by dwarf grooves 14 when the plug is in either full open or full closed positions. When these grooves have been substantially filled lubricant pressure will build up beneath the plug and cause the same to shift upwardly compressing spring 24. Upward shifting of the plug B will cause passage 32 to move out of alignment with the passage adjacent the end of check 12 and further lubricant can not be fed into the system. The parts will then be in the position as clearly shown in Fig. 4. Rotation of the valve is accomplished through the stem C and through its attached lugs 21 engaging the disc D, which in turn will through lugs 34 cause rotation of the plug B. Movement of the plug will eventually dissipate the lubricant which is held under pressure by means of the spring 24 and the parts will again assume the position such as shown in Fig. 1 wherein the valve can again be lubricated. It is to be noted that the arrangement of passages 31 and 32 is such that the valve can only be lubricated when in either the full open or full closed positions and also only when the valve needs lubricant, that is, when the plug has been shifted downwardly under action of spring 24 after dissipation of the lubricant beneath the plug.

In the modification shown in Figs. 6 to 9 inclusive the general arrangement is substantially the same as that described in connection with Figs. 1 to 4 inclusive and accordingly the same reference characters have been utilized wherever possible. In this form, however, the surface of the plug is provided with a bottom circumferential groove 36 and diametrically opposed full length grooves 37 which intersect the circumferential groove 36 and extend from adjacent the top of the plug to the bottom of the plug. Short longitudinally extending grooves 38 are located diametrically opposite each other and adjacent the plug passage P. These grooves do not connect directly with either the bottom circumferential groove or short grooves 39 except at such times as the plug is in the full open or closed position and the grooves are in alignment with the dwarf grooves 14 formed in the body as previously described. In this form the body is also provided with upper dwarf grooves 41 which serve to connect the upper ends of grooves 38 when the valve is in full open or closed position with a transversely extending passage 42. A passage 43 arranged substantially at ninety degrees to passage 42 extends completely through the valve plug and connects at all times the upper ends of grooves 37. In addition to these passages short passages 44 and 45 extend inwardly from the periphery of the plug to the point of intersection of passages 42 and 43, thus when the valve is in full open position as shown in the figures lubricant under pressure may be supplied through the fitting 13 and passage 45 to the passages 42 and 43. From these passages lubricant will be fed downwardly through grooves 37 and also through 38, due to dwarf grooves 14 and 41, into the space beneath the plug, lubricant pressure will then cause the plug to rise against the spring 24 until the parts have assumed the position shown in Fig. 9. As soon as the parts have shifted the flow of lubricant from the external pressure source will be cut off since passage 45 is no longer in alignment with the passage adjacent the check valve 12. The spring 24 will maintain the lubricant beneath the plug under pressure and provide a continuous supply to grooves 37 and 38 whenever the valve is in full open or closed position. Lubricant cannot be dissipated, however, during rotation of the valve plug since the grooves 38 will be cut off from communication with the lubricant whenever they are moving past the passageway 2 in the body. It is to be noted that the same cut off action occurs when the valve is in the fully closed position since then passage 44 will be cut off and out of communication with the external source of pressure whenever the valve is fully lubricated.

In some instances it is desirable that the mass of lubricant retained in the valve be positioned adjacent the stem end thereof to additionally seal against any leakage which may occur. Where such location is desirable the valve may be constructed as shown in Figs. 10 to 17 inclusive. In this form of valve a relatively light top spring 46 is interposed between the stem and floating disc D and takes the place of the spring 24 previously referred to. A much heavier spring 47 is positioned beneath the plug and bears at its upper end upon the bottom of the plug and at its lower end bears upon the base cap 7 and is located in a recess formed therein. It is desirable after periods of standing that the old lubricant be forced out and for this purpose a removable screw plug 48 is provided and normally closes a passage leading through the valve body adjacent the upper end thereof.

In the specific form of valve shown in Figs. 10 to 12 inclusive lubricant from an external pressure source connected to fitting 13 will be forced in through either passage 49 or 50 adjacent the bottom of the plug and thence flow upwardly through hole 51 to the space above the plug as clearly shown in Figs. 10 and 11. The lubricant passing into the space above the plug will with the assistance of spring 46, compress the much heavier spring 47 and shift the plug downwardly in the body, thus cutting off communication between passage 49 and the source of external pressure when the valve is in fully open position or between the source and passage 50 when the valve is in fully closed position. The fully lubricated position of the valve is shown clearly in Fig. 13 and the heavy spring 47 will continuously tend to shift the plug upwardly against the spring 46 and will continuously feed lubricant to the diametrically disposed longitudinally extending grooves 52. Diametrically opposed longitudinal grooves 53 will be fed by lubricant under pressure only when the plug is in the full open or closed positions since at this time the discontinuous grooves 53 will be in alignment with upper dwarf grooves or cavities 54 located in the valve body. In this form, like in that previously described, short grooves 55 extend upwardly from the bottom of the plug and serve to dissipate any fluid which may be trapped beneath the plug and which must escape during lubrication and downward shifting of the plug in the body.

The modification shown in Figs. 14 to 17 is similar to the form shown in Figs. 10 to 13 in that lubricant is fed to the upper portion of the plug and the same shifts downwardly to cut off the supply of lubricant under pressure when the valve is fully lubricated. In this form the plug is formed with an upper circumferential groove 56 intersecting diametrically opposed longitudinal grooves 57 and short stub grooves 58. Diametrically opposed grooves 59 located on the opposite side of passage P from grooves 57 do not intersect the circumferential groove 56 but are only connected to the same when the valve is in full open or closed position, at which time they are brought into communication by the upper dwarf grooves or cavity 54. The lower ends of grooves 57 are joined by a transverse passage 60, while the lower ends of grooves 59 are joined by a transverse passage 61. These passages intersect adjacent the axis of the plug and are supplied lubricant through short passages 62 or 63, the passage 62 serving to supply lubricant introduced through fitting 13 when the valve is in fully closed position, while passage 63 supplies lubricant from the fitting when the valve is in fully open position as shown. In this form lubricant can enter passage 62 or 63 when the plug is in the up position, but can not enter when the plug has been shifted downwardly by lubricant forced into the space above the plug or, in other words, when the valve is fully lubricated.

It is sometimes desirable to supply lubricant to what might be termed the down stream of the valve in order to conserve lubricant, accordingly the parts may be arranged as shown in Figs. 18 to 23. In this form the valve is generally similar to that previously described in connection with Figs. 1 to 9 inclusive and accordingly the same reference characters will be used wherever possible. In this form of valve the plug is formed with four longitudinally extending main grooves which may be grouped into pairs and indicated by numerals 66 and 67. The pairs of grooves are located on opposite sides of the plug and adjacent the ends of the passageway P as most clearly indicated in the developments shown on Figs. 22 and 23. The groove pairs 66 are slightly longer than the groove pairs 67. Immediately beneath each groove 66 or 67 is located a short groove 68 extending downwardly to the bottom surface of the plug. Due to the varying length of grooves 66 and 67 the uninterrupted plug surface between the grooves and the short grooves 68 is of different extent as clearly shown by the developments of Figs. 22 and 23. As clearly shown in Figs. 18, 19, 20 and 22 lubricant under pressure can be fed to the space beneath the plug by the flow of lubricant through the fitting 13 and passages 32 and 33. During the time when the plug is in the down position lubricant can also be supplied upwardly through both pairs of grooves 66 and 67. As the lubricant builds up pressure beneath the plug it causes the plug to shift upwardly against spring 24 and lubricant can no longer be supplied through fitting 13 since passage 32 will no longer be in registry with the passage in the body adjacent check valve 12. With the plug in the upwardly shifted or fully lubricated position it is to be noted that the pairs of grooves 67 are no longer in registry with the dwarf grooves 14 and accordingly can not be supplied with lubricant under pressure. The pairs of grooves 66, however, being longer, are still in communication with their dwarf grooves 14 and accordingly lubricant under pressure is forced upwardly into these grooves. With the valve in a closed position, that is, after being rotated ninety degrees in a clockwise direction from that shown in Fig. 19, the grooves 66 will be on the right hand side of the figure or what may be termed the down stream side, thus lubricant will be supplied only to the side of the valve subjected to greatest pressure and the grooves on the up stream side, being free of bearing pressure between the plug and body, will not be supplied with lubricant and are only charged when the valve plug is in a down position or in the preliminary stages of being lubricated by an external pressure source.

From the preceding description of the various forms it will be seen that a valve has been provided in which stem leakage is prevented and in which the stem is held firmly in position against the body shoulder preventing any possible entrance of harmful material such as chips which may have been trapped in the valve. It will be evident also that a valve has been provided in which the shifting of the plug axially under pressure of the matter in the pipe line will have no effect on the stem seating since they are independent and coupled for rotational movement only through a floating disc. Each of the valves is lubricated by a system which prevents damage to the valve by cutting off the source of external lubricant pressure as soon as the valve has become fully lubricated. Each of the valves also supplies lubricant from an internal reservoir maintained under pressure and supplying the lubricant grooves formed in either the plug surface or the body bore. In addition to this the valve shown in Figs. 18 to 21 has the grooves so arranged as to supply lubricant from the internal reservoir to the seating surfaces which are on the down stream or thrust side of the plug, that is, lubricant is supplied to those surfaces which require it most, but is cut off for at least a part of the time from those surfaces which do not require special lubrication. While the invention has been described more or less in detail with specific reference to certain forms of valves, it is obvious that various modifications and variations other than those shown and described may be made and all such modifications and variations are contemplated as fall within the scope of the invention as defined by the following claims.

What is claimed is:

1. In a lubricated valve, a body having a passageway therethrough for the flow of matter, a substantially cylindrical bore intersecting the passageway, a body head portion partially closing one end of said bore, a stem member formed with a shoulder portion located within the body and engaging said head portion to provide a seal and also formed with an operating portion projecting outwardly through the head portion, a substantially cylindrical plug rotatably and slidably mounted wholly within said bore, means connecting said stem member and plug whereby rotational movement only may be transmitted from one to the other, resilient means urging said plug and stem in opposite directions axially of the bore and means to supply lubricant under pressure beneath the lower end of said plug to cause axial shift of the plug within said bore and relative to said stem.

2. In a lubricated valve, a body having a passageway therethrough for the flow of matter, a substantially cylindrical bore intersecting the passageway, a body head portion partially closing one end of said bore, a stem member formed with a shoulder portion located within the body and engaging said head portion to provide a seal and also formed with an operating portion projecting outwardly through the head portion, a substantially cylindrical plug rotatably and slidably mounted wholly within said bore, means connecting said stem member and plug whereby rotational movement only may be transmitted from one to the other, resilient means urging said plug and stem in opposite directions axially of the bore, and means to supply lubricant under pressure to one end at least of said plug to cause axial shift of the plug within said bore and relative to said stem, said means being so constructed and arranged as to cut off the supply of lubricant upon a predetermined axial shift of said plug.

3. In a lubricated valve, a body having a passageway therethrough for the flow of matter, a substantially cylindrical bore intersecting the passageway, a body head portion partially closing one end of said bore, a stem member formed with a shoulder portion located within the body and engaging said head portion to provide a seal and also formed with an operating portion projecting outwardly through the head portion, a substantially cylindrical plug rotatably and slidably mounted wholly within said bore, means connecting said stem member and plug whereby rotational movement only may be transmitted from one to the other, resilient means urging said plug and stem in opposite directions axially of the bore and means to supply lubricant under pressure to one end at least of said plug to cause axial shift of the plug within said bore and relative to said stem, said means including means limiting the supply of lubricant to the one end of said plug upon a predetermined axial shift of said plug.

4. In a lubricated valve, a body having a passageway therethrough for the flow of matter, a substantially cylindrical bore intersecting the passageway, a body head portion partially closing one end of said bore, a stem member formed with a shoulder portion located within the body and engaging said head portion to provide a seal and also formed with an operating portion projecting outwardly through the head portion, a substantially cylindrical plug rotatably and slidably mounted wholly within said bore, means connecting said stem member and plug whereby rotational movement only may be transmitted from one to the other, resilient means bearing directly on said stem and plug and urging said plug and stem in opposite directions axially of the bore, additional resilient means urging said plug toward said stem shoulder, said resilient means acting in series to hold said shoulder portion in sealing engagement with said body head portion, and means to supply lubricant under pressure between said plug and stem to cause axial shift of said plug away from said stem and compression of said additional resilient means.

5. In a lubricated valve, a body having a passageway therethrough for the flow of matter, a substantially cylindrical bore intersecting the passageway, a body head portion partially closing one end of said bore, a stem member formed with a shoulder portion located within the body and engaging said head portion to provide a seal and also formed with an operating portion projecting outwardly through the head portion, a substantially cylindrical plug rotatably and slidably mounted wholly within said bore, means connecting said stem member and plug whereby rotational movement only may be transmitted from one to the other, resilient means urging said plug and stem in opposite directions axially of the bore, additional resilient means urging said plug toward said stem, and means to supply lubricant under pressure between said plug and stem to cause axial shift of said plug away from said stem and compression of said additional resilient means, said means including passages aligned in one position of the plug and movable out of alignment to cut off the supply of lubricant upon a predetermined axial shift of said plug.

6. In a lubricated valve, a body having a passageway therethrough for the flow of matter, a substantially cylindrical bore intersecting the passageway and finished to provide a seating surface, a body head portion partially closing one end of said bore and provided with a head seating surface, an operating stem member projecting outwardly from the head portion and formed with a seating surface adapted to engage said head seating surface to seal against leakage, a substantially cylindrical plug rotatably and slidably mounted wholly within said bore and finished to provide a seating surface cooperating with said bore seating surface, connecting means between said stem member and plug for transmitting rotational movement only whereby said plug may be moved between open and closed positions controlling the flow of matter through the passageway, resilient means interposed between said plug and stem and forcing said stem and head seating surfaces into engagement, and means to supply lubricant under pressure beneath the opposite end of said plug to cause axial shift of the plug within the bore and increase the seating force upon said stem and head seating surfaces.

7. In a lubricated valve, a body having a passageway therethrough for the flow of matter, a substantially cylindrical bore intersecting the passageway and finished to provide a seating surface, a body head portion partially closing one end of said bore and provided with a head seating surface, an operating stem member projecting outwardly from the head portion and formed with a seating surface adapted to engage said head seating surface, a substantially cylindrical plug rotatably and slidably mounted wholly within said bore and finished to provide a seating surface cooperating with said bore seating surface, connecting means between said stem member and plug for transmitting rotational movement only whereby said plug may be moved between open and closed positions controlling the flow of matter through the passageway, resilient means interposed between said plug and stem and forcing said stem and head seating surfaces into engagement, and means to supply lubricant under pressure to one end at least of said plug to cause axial shift of the plug within the bore and increase the seating force upon said stem and head seating surfaces, said last named means including passages in said body and plug moving out of registry during axial shift to cut off the supply of lubricant to said one end of the plug.

8. In a lubricated valve, a body having a passageway therethrough for the flow of matter, a substantially cylindrical bore intersecting the passageway and finished to provide a seating surface, a body head portion partially closing one end of said bore and provided with a head seating surface, an operating stem member projecting outwardly from the head portion and formed with a seating surface adapted to engage said head seating surface, a substantially cylindrical plug rotatably and slidably mounted wholly within said bore and finished to provide a seating surface cooperating with said bore seating surface, connecting means between said stem member and plug for transmitting rotational movement only whereby said plug may be moved between open and closed positions controlling the flow of matter through the passageway, resilient means interposed between said plug and stem and forcing said stem and head seating surfaces into engagement, longitudinal grooves interrupting the plug seating surface, passages in said plug and body adapted to supply lubricant under pressure external of the valve to said grooves and to one end of said plug to cause axial shift of the plug within said bore and relative to said stem.

9. In a lubricated valve, a body having a passageway therethrough for the flow of matter, a substantially cylindrical bore intersecting the passageway and finished to provide a seating surface, a body portion partially closing one end of said bore and provided with a head seating surface, an operating stem member projecting outwardly from the head portion and formed with a seating surface adapted to engage said head seating surface, a substantially cylindrical plug rotatably and slidably mounted wholly within said bore and finished to provide a seating surface cooperating with said bore seating surface, connecting means between said stem member and plug for transmitting rotational movement only whereby said plug may be moved between open and closed positions controlling the flow of matter through the passageway, resilient means interposed between said plug and stem and forcing said stem and head seating surface into engagement, longitudinal grooves interrupting the plug seating surface, passages in said plug and body adapted to supply lubricant under pressure external of the valve to said grooves and to one end of said plug to cause axial shift of the plug within said bore and relative to said stem, said passages in the plug and body moving out of alignment during axial shift of the plug to cut off further supply of said lubricant under pressure.

10. In a lubricated valve, a body having a passageway therethrough for the flow of matter, a substantially cylindrical bore intersecting the passageway and finished to provide a seating surface, a body head portion partially closing one end of said bore and provided with a head seating surface, an operating stem member projecting outwardly from the head portion and formed with a seating surface adapted to engage said head seating surface, a substantially cylindrical plug rotatably and slidably mounted wholly within said bore and finished to provide a seating surface cooperating with said bore seating surface, connecting means between said stem member and plug for transmitting rotational movement only whereby said plug may be moved between open and closed positions controlling the flow of matter through the passageway, resilient means interposed between said plug and stem and forcing said stem and head seating surfaces into engagement, longitudinal grooves interrupting the plug seating surface, dwarf grooves interrupting the bore seating surfaces and in alignment with said longitudinal grooves when said plug is in full open or full closed position, and means to supply lubricant under pressure from external of the valve to said grooves and to one end of said plug to cause axial shift of the plug within said bore, certain of said longitudinal grooves moving out of register with the corresponding dwarf grooves upon axial shift of the plug under lubricant pressure to thereby cut off flow of lubricant thereto.

References Cited in the file of this patent

UNITED STATES PATENTS

| Number | Name | Date |
|---|---|---|
| 1,482,478 | Milligan | Feb. 5, 1924 |
| 1,755,406 | Nordstrom | Apr. 22, 1930 |
| 1,994,618 | Nordstrom | Mar. 19, 1935 |
| 2,011,113 | Neuhaus | Aug. 13, 1935 |
| 2,147,851 | Mallon | Feb. 21, 1939 |
| 2,269,887 | Sharp | Jan. 13, 1942 |
| 2,373,964 | Knox | Apr. 17, 1945 |